Feb. 25, 1964
B. H. PINCKAERS
3,122,641
RADIATION CONDITION SENSING APPARATUS WITH
BACKGROUND DISCRIMINATION
Filed Jan. 30, 1961
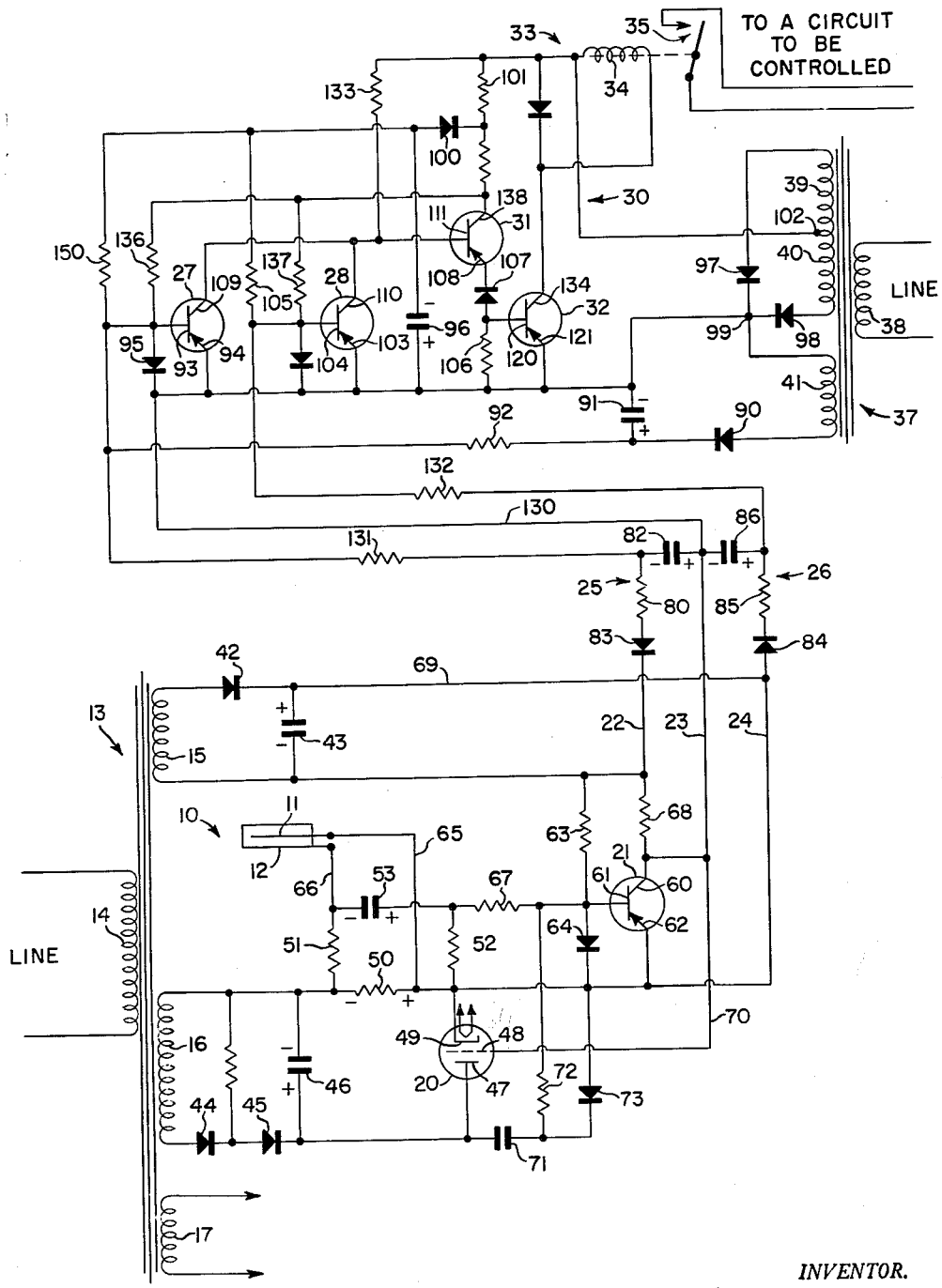
INVENTOR.
BALTHASAR H. PINCKAERS
BY
ATTORNEY United States Patent Office 3,122,641
Patented Feb. 25, 1964

3,122,641
RADIATION CONDITION SENSING APPARATUS WITH BACKGROUND DISCRIMINATION
Balthasar H. Pinckaers, Edina, Minn., assignor to Minneapolis-Honeywell Regulator Company, Minneapolis, Minn., a corporation of Delaware
Filed Jan. 30, 1961, Ser. No. 85,615
5 Claims. (Cl. 250—83.3)

The present invention is concerned with an improved control apparatus and particularly with an improved control apparatus utilizing a Geiger tube condition sensor which supplies control signals to a "count gate" and a "no count gate" for background count discrimination.

As is well known, a Geiger tube is the type of condition sensor which is constructed and arranged to provide a series of discrete short time duration signal pulses upon being subjected to a condition to which it is sensitive. When the Geiger tube is subjected to such a condition, the output of the Geiger tube consists of a frequent and sustained count which may be of random time interval spacing. However, while the spacing of the individual counts or signal pulses may be of random interval, so long as the Geiger tube is subjected to the condition to which it is sensitive these spacings are not long in time duration. When the Geiger tube is not subjected to a condition to which it is sensitive, then the Geiger tube has what is known as an inherent background count. That is, the Geiger tube, even while not subjected to a condition to which it is sensitive, supplies at an infrequent rate a periodic count or signal pulse due to external phenomena which cause the Geiger tube to periodically count at this background rate. The presence or absence of the condition to which the Geiger tube is sensitive can be deteted by means which responds to a sustained counting rate but does not respond to the background counting rate The present invention is concerned with the improved means for discriminating against the background count of the Geiger tube, or more broadly a condition sensor of the type which provides individual signal pulses at a somewhat predictable rate when subjected to a given condition. Specifically, this is accomplished by means of gate type circuits which respond to both the "no-count" signal and the "count" signal. So long as these two signals remain in a pre-determined specific balance or relationship, an output is provided indicative of the fact that the Geiger tube is subjected to the condition to which it is sensitive.

More specifically, the inventive concept of the present invention is achieved, in the preferred embodiment, by means of a transistor which operates in two separate states of operation in response to an individual signal pulse or the time duration between signal pulses respectively. The two states of operation of this transistor are then applied to two further transistors, each of the transistors being responsive to a separate of the two states of operation of the first transistor. So long as the relationship between the two states of operation of the first transistor bears a pre-determined relationship, then the second and third transistor are controlled in a particular manner to cause an output to exist, thus indicating that the Geiger tube is subjected to a condition to which it is sensitive.

The present invention will be apparent to those skilled in the art upon reference to the following specification, claims, and drawing, of which the single figure is a schematic representation of a preferred embodiment of the present invention.

The condition sensor, in the form of a Geiger tube, is identified generally by means of reference numeral 10. The anode of the Geiger tube is identified by reference numeral 11 while the cathode is identified by reference numeral 12. Operating voltage for Geiger tube 10 is derived from a transformer 13 having a primary winding 14 connected to a source of alternating voltage, not shown. Transformer 13 is likewise provided with secondary windings 15, 16 and 17.

The Geiger tube is connected in controlling relation to a network including a low voltage electron discharge device 20 and a first transistor 21. Transistor 21 can be considered to be the output portion of the means including elements 10, 20 and 21 and this output is derived across conductors 22, 23 and 24. These conductors are connected to first and second integrating circuits identified generally by means of the reference numerals 25 and 26.

The output of integrating network 25, which can be considered to be the "no-count" signal is applied to the input of a transistor 27. The output of the integrating network 26, which can be considered to be the "count" output, is connected in controlling relation to a transistor 28. Transistors 27 and 28 constitute a gate type network which, in conjunction with the respective integrating circuits 25 and 26, is effective to control a transistor type switch designated generally by means of the reference numeral 30. This switch includes transistors 31 and 32, transistor 32 having a main control relay 33 connected to the output electrodes thereof. The main control relay 33 is provided with a winding 34 and a normally open switch 35. As will be appreciated, relay 33 may be provided with a variety of switching functions and for purposes of simplicity a single switch has been shown and by means of a legend on the drawing it has been indicated that this switch is connected to a circuit to be controlled. It will be readily appreciated that a variety of switching functions could be performed by relay 33. A single switch is shown for purposes of simplifying the disclosure.

Operating voltage for the portion of the apparatus including transistors 27, 28, 31 and 32 is derived from a second transformer 37 having a primary winding 38 connected to the source of alternating voltage, and having secondary windings 39, 40 and 41.

Referring now to the various portions of the apparatus in greater detail, secondary winding 15 of transformer 13 is effective in conjunction with a rectifier 42 to provide a source of D.C. voltage at capacitor 43, the polarity of this voltage being as shown. Secondary winding 16 in conjunction with rectifiers 44 and 45 and a capacitor 46 is effective to provide a source of D.C. voltage at the capacitor of the polarity indicated. The secondary winding 17 provides a source of filament voltage to heat the filament of hot cathode discharge device 20.

Discharge device 20 is provided with an anode 47, a control electrode 48 and a cathode 49. The anode 47 is directly connected to the positive plate of capacitor 46 whereas the cathode of this discharge device is connected through a resistor 50 to the negative terminal of this capacitor. Thus, so long as discharge device 20 is conductive, a voltage is derived across resistor 50 such that the right hand terminal of this resistor is positive of the respect to the left hand terminal, as shown on the drawing. The positive voltage present at the right hand terminal of this resistor is applied to the anode 11 of Geiger tube 10 whereas the negative terminal of this resistor is connected through a further resistor 51 to the cathode 12 of the Geiger tube. Furthermore, the positive terminal of resistor 50 is connected through a resistor 52 to a capacitor 53, the other plate of this capacitor being connected to the negative terminal resistor 50 through the above mentioned resistor 51. Thus, capacitor 53 is charged from resistor 50 to the polarity indicated. In this manner, operating voltage is applied to Geiger tube 10, this operating voltage being dependent upon the conduction of discharge device 20.

The control electrode 48 of discharge device 20 is connected to the collector electrode 60 of transistor 21, this transistor having a base electrode 61 and an emitter electrode 62. Transistor 21 is normally biased to a conducting state by means of a forward biasing circuit which can be traced from the positive terminal of capacitor 43 through conductors 69 and 24, the emitter to base circuit of transistor 21 and resistor 63 to the lower terminal of capacitor 43. Thus, with transistor 21 conductive, the potential level of its collector electrode 60 is substantially at the potential of its emitter 62, the emitter 62 being directly connected to the cathode 49 of discharge device 20. Thus, so long as transistor 21 is maintained conductive by means of the above mentioned forward biasing circuit, discharge device 20 is also maintained conductive to apply an operating voltage to Geiger tube 10.

Considering now the operation of the apparatus thus far described, it has been pointed out that in the normal condition of operation, transistor 21 and discharge device 20 are both conductive and an operating voltage is applied to the Geiger tube 10. Assume now that a single count or ionizing event occurs within Geiger tube 10. A current flow circuit can now be traced from the positive terminal of capacitor 53 through resistor 52, conductor 65, Geiger tube 10, and conductor 66 to the negative terminal of this capacitor. A further current flow circuit can be traced from the positive terminal of this capacitor through a resistor 67, diode 64, conductor 65, Geiger tube 10, and conductor 66 to the negative terminal of this capacitor. The voltage thus developed across diode 64 is such as to place a positive potential on base 61 of transistor 21 and a negative potential on the emitter of this transistor. Thus, transistor 21 is rendered non-conductive by means of the above traced current flow circuit. With transistor 21 non-conductive, the potential level of its collector electrode 60 is substantially that potential existing at the negative plate of capacitor 43 since there is no longer a current flow through resistor 68. The positive terminal of capacitor 43 is connected by means of conductors 69 and 24 to the cathode of discharge device 20 whereas the collector electrode 60 of transistor 21 is connected by means of conductor 70 to the control electrode of this discharge device. Thus, discharge device 20 is rendered non-conductive.

As thus far explained, transistor 21 is rendered non-conductive as a result of the discharge current flow circuit from capacitor 53 through Geiger tube 10. As a result of the non-conduction of transistor 21, discharge device 20 is rendered non-conductive. With discharge device 20 momentarily non-conductive, a voltage is no longer developed across resistor 50 and the discharge of capacitor 53 continues until this capacitor is substantially completely discharged.

As has been pointed out, the single pulse of current from the Geiger tube 10 now under consideration is of relatively short time duration. A pulse stretching means in the form of a capacitor 71 and a resistor 72 is provided to stretch this pulse in time. Capacitor 71, at the time that discharge device 20 is conductive, is substantially completely discharged. However, upon discharge device 20 being rendered non-conductive, as above described, capacitor 71 charges from a circuit which can be traced from the positive terminal of capacitor 46 through capacitor 71, resistor 72, diode 64 and resistor 50 to the negative terminal of this capacitor 46. The voltage thus developed across diode 64 is in a direction to maintain transistor 21 in a non-conductive condition and thereby maintain discharge device 20 in a non-conductive condition for an interval of time as determined by the charging time of capacitor 71. Thus, once transistor 21 and discharge device 20 are rendered non-conductive by a single signal pulse received from Geiger tube 10, they are maintained in this condition for a stretched time period which is much longer than the time period of the signal pulse derived from Geiger tube 10.

After this stretched time period, however, transistor 21 is no longer biased to be non-conductive since the charging current for capacitor 71 has decreased to a value less than the bias current through resistor 63. Thus, transistor 21 is again rendered regeneratively conductive by means of the above traced forward biasing circuit and the potential level of its collector electrode 60 again assumes approximately the potential level of the cathode of discharge device 20 and this discharge device is rendered conductive to again apply a rapidly increasing operating voltage to Geiger tube 10, it being remembered that capacitor 53 is recharged as a result of the voltage developed across resistor 50. Furthermore, a diode 73 is provided to substantially immediately discharge capacitor 71 to thus place this pulse stretching capacitor in a condition to immediately perform its pulse stretching function, should the Geiger tube 10 immediately supply a second signal pulse. This discharging current flow circuit can be traced from the left hand plate of capacitor 71 through the plate to cathode circuit of discharge device 20, and through diode 73 to the right hand plate of this capacitor.

Thus far, consideration has been given to the presence of a single count or signal pulse from Geiger tube 10, followed by a time interval in which there could be no signal pulse. It will be remembered that during the presence of the signal pulse, and for a short time thereafter as determined by the pulse stretching function of capacitor 71, transistor 21 is non-conductive. When transistor 21 is non-conductive substantially the full supply voltage of capacitor 43 appears across the emitter to collector circuit of this transistor, the emitter being positive with respect to the collector. Thus, conductor 24 is positive with respect to conductor 23 and conductor 23 is at substantially the potential level of the negative terminal of the capacitor 43. During the second state of operation of transistor 21, that is during the absence of the signal pulse, this transistor is conductive and substantially the full supply voltage of capacitor 43 now appears across resistor 68. The polarity of this voltage is such that the lower terminal is positive with respect to the upper terminal. Thus, during this state of operation of transistor 21, conductor 22 is negative and conductor 23 is positive, the potential level of conductor 23 being substantially that of the upper terminal of capacitor 43.

As a result, the signal which exists between conductors 23 and 24 can be considered to be the "count output" while the signal appearing between conductors 22 and 23 can be considered to be the "no count output."

Conductors 22 and 23, that is the "no count output" is connected to integrating means 25 including a diode 83, a resistor 80 and a capacitor 82 to thus charge this capacitor such that the left hand plate of the capacitor is negative with respect to the right hand plate, as shown. Conductors 23 and 24, that is the "count" output, is connected to integrating means 26 including diode 84, resistor 85 and capacitor 86 to thus charge capacitor 86 such that its right hand plate is positive with respect to its left hand plate, as shown.

Furthermore, it can be seen that the magnitude of voltage present on capacitors 82 and 86 is the integrated output of transistor 21, the output being alternately taken across its load resistor 68 and across its emitter to collector circuit. In the presence of a sustained count from Geiger tube 10, as indicative of the presence of the condition to which the Geiger tube is sensitive, transistor 21 alternates between its conductive and non-conductive states at a rather regular interval and a given balance or relationship of voltage will exist between capacitors 82 and 86. In the presence of only a background counting rate, then transistor 21 remains predominately in a conducting state and the voltage on capacitor 82 is large compared to the voltage on capacitor 86. This relationship of voltage on capacitors 82 and 86 is utilized, in a manner to be described, to discriminate against the background count of Geiger tube 10 and to provide an output indicative of the fact that the Geiger tube is subjected to a condition to which it is sensitive.

The means for utilizing the voltages on capacitors 82 and 86 includes what may be termed an "and gate" including transistors 27 and 28. Transistor 27 is normally biased to be non-conductive by means of a source of reverse biasing circuit including a diode 90 and a capacitor 91, the capacitor being charged to the polarity indicated. The reversed biasing circuit for transistor 27 can be traced from the positive terminal of capacitor 91 through a resistor 92, and diode 95 to the negative terminal of capacitor 91. The voltage thus developed across diode 95 is effective to place a reverse biasing voltage on base 93 and emitter 94 of transistor 27, thus maintaining this transistor non-conductive.

Transistor 28 is maintained in a normal conducting state by means of a source of voltage existing at a capacitor 96, this capacitor being charged from a full wave rectifier formed by diodes 97 and 98. The current flow circuit whereby capacitor 96 is charged can be traced from terminal 99 through capacitor 96, diode 100, resistor 101 to terminal 102 of transformer 37. The forward biasing current for transistor 28 can be traced from the lower positive plate of capacitor 96 through emitter 103 and base 104 of transistor 28, and resistor 105 to the negative terminal of capacitor 96. Thus, transistors 27 and 28 are rendered non-conductive and conductive, respectively.

The output circuits of transistors 27 and 28 are connected to the input circuit of a transistor 31. Specifically, the emitter electrodes 94 and 103 are connected through a resistor 106 and a diode 107 to the emitter electrode 108 of transistor 31 while the collector electrodes 109 and 110 of these transistors are connected to the base electrode 111 of transistor 31. Thus, so long as either of the transistors 27 and 28 is conductive, transistor 31 is rendered non-conductive since the emitter to collector voltage drop of the conductive one of the transistors 27 and 28 is substantially zero or at least less than the necessary forward voltage of diode 107 and a forward bias voltage is not developed between the emitter and base of transistor 31.

Since transistor 31 is non-conductive, no voltage is developed across resistor 106 and therefore transistor 32 is likewise maintained non-conductive, its base electrode 120 and its collector electrode 121 being connected across this resistor.

Referring once again to the integrating circuits 25 and 26, it can be seen that the output voltage of integrating circuit 25 is connected in controlling relation to the input circuit of transistor 27. Specifically, the positive plate of capacitor 82 is connected by means of conductor 130 to the emitter electrode 94 of transistor 27 whereas the base electrode of this transistor is connected through a resistor 131 to the negative plate of capacitor 82. Thus, it can be seen that the voltage present on capacitor 82 constitutes a forward biasing current for transistor 27.

Referring now to integrating means 26, the output voltage of this integrating means is connected in controlling relation to the input of transistor 28. Specifically, the positive terminal of capacitor 86 is connected through a resistor 132 to the base electrode 104 of transistor 28 and the emitter electrode of this transistor is connected by conductor 130 to the negative terminal of capacitor 26. In order for an output to exist, that is for relay 33 to be energized, both transistor 27 and transistor 28 must be non-conductive. This condition occurs when a specific relationship exists between the voltage on capacitor 82 and the voltage on capacitor 86. In other words, the magnitude of voltage on capacitor 82 must not be large enough to overcome the reverse biasing current normally provided for transistor 27 and thus transistor 27 must remain non-conductive. Furthermore, the reverse biasing current derived from capacitor 86 must be large enough to overcome the normal forward biasing current provided for transistor 28 and must then render transistor 28 non-conductive.

Assuming that Geiger tube 10 is subjected to a condition to which it is sensitive and thus transistor 21 alternates between its conductive and non-conductive states at the given rate indicative of such a condition, then the voltages on capacitors 82 and 86 will be of this predetermined relationship. The voltage on capacitor 82 will not be sufficiently high to overcome the normal non-conducting biasing current for transistor 27 and thus this transistor is maintained non-conductive. The voltage on capacitor 86 is of a sufficient magnitude as to overcome the forward biasing current supplied for transistor 28 and thus this transistor is rendered non-conductive by means of the voltage on capacitor 86.

As a result, transistor 31 is rendered conductive by means of a forward biasing current which can be traced from terminal 99 through resistor 106, diode 107, the emitter to base circuit of transistor 31, and resistor 133 to the terminal 102. With transistor 31 conductive, a voltage is developed across resistor 106 such that the lower terminal of this resistor is positive. This voltage is applied to emitter electrode 121 and base electrode 120 of transistor 32 and this transistor is thus rendered conductive. A current flow circuit can now be traced from terminal 99 through the emitter 121, the collector 134, and relay winding 34 to terminal 102, to thus energize the relay and close switch 35, the closing of this switch being indicative of the presence of the condition to which the Geiger tube 10 is sensitive.

Resistors 136 and 137, which are connected from the base electrodes of transistors 27 and 28 to the collector electrode 138 of transistor 31, are effective to provide sufficient half-wave bias during each half-cycle of the unfiltered D.C. supply voltage to keep transistors 27 and 28 completely in saturation. At the beginning of each successive half-cycle, when the base-emitter voltages are the net result of only the filtered D.C. inputs to transistors 27 and 28, the circuit decides whether or not transistor 31 (and 32) is going to be conductive during the then beginning half-wave of the supply voltage. If transistor 31 does become conductive, which can only be so if at the beginning of the half-cycle both transistors 27 and 28 are non-conductive, a voltage drop occurs across resistor 101. This voltage drop is especially important at the 90-degree or mid-point of the then in progress half-wave since then capacitor 96 is charged. However, with the voltage drop across resistor 101 existing at that instant capacitor 96 will have to partially discharge, so that at the beginning of the next half-wave when the circuit must decide again, transistor 31 will surely become conductive, and so for every succeeding half-wave interval until such time that one or the other of the inputs to transistors 27 and 28 has changed so as to render either (or both) conductive again at the beginning of a half-cycle. Then transistor 31 will not be conductive during that half-cycle and capacitor 96 will quickly be charged to its original value of voltage. Resistors 136 and 137 provide for snap-action during each individual half-cycle but the action of capacitor 96 and resistor 101 provides vertical snap-action on a "many cycle" basis (or long term basis) and also determines the circuit differential.

Thus far, the explanation of my improved control apparatus has dealt with the two normal conditions of operation wherein the Geiger tube 10 either experiences a sustained count indicative of the condition to which it is sensitive, or experiences only a normal random background count. For purposes of explanation, assume that Geiger tube 10 experiences a rather high background counting rate, due to the environmental condition in which the Geiger tube is placed, but that the Geiger tube is not actually subjected to a condition to which it is sensitive. With such a condition existing, transistor 21 alternates between its conductive and non-conductive states at a somewhat rapid rate. Furthermore, it may be that the voltage thus developed across capacitor 26 is sufficient to render transistor 28 non-conductive. However, during even this relatively high background counting rate, which is not of the same order as received when the Geiger tube is subjected to a condition to which it is sensitive, the voltage developed across capacitor 82 is abnormally high and transistor 27 is, as a result, rendered conductive. Thus, it can be seen that with even an abnormally high background counting rate, my improved control apparatus is effective to discriminate against this abnormaly high count rate since capacitor 82 is charged to an unduly high voltage and as a result transistor 27 is rendered conductive to thereby maintain transistors 31 and 32 non-conductive and as a result to maintain output relay 33 de-energized.

From the above description it can be seen that I have provided an improved control apparatus having a great degree of discrimination against background count which is received from a condition sensor of the type which supplies the series or a chain of signal pulses upon being subjected to the condition to which it is sensitive. Other modifications of the present invention will be apparent to those skilled in the art and it is, therefore, intended that the scope of the present invention be limited solely by the scope of the appended claims.

I claim as my invention:

1. Control apparatus comprising; condition sensing means providing a continuous series of spaced signal pulses each of which is individually separated by a short time interval upon the condition sensing means being subjected to a condition to which it is sensitive; a controllable current conducting device having a pair of input electrodes and a pair of output electrodes, biasing means, means connecting said input electrodes to said biasing means to establish a first stable state of operation for said current conducting device, means connecting said input electrodes to said condition sensing means to cause said current conducting device to assume an unstable state of operation upon the presence of each individual signal pulse at the input electrodes thereof, a load impedance, circuit means connecting said load impedance to said output electrodes; and further means having a first portion connected to said output electrodes and having a second portion connected to said load impedance, said further means being constructed and arranged to compare the signal developed across said output electrodes with the signal developed across said load impedance.

2. Control apparatus comprising; Geiger tube condition sensing means adapted to supply a series of spaced signal pulses of short time duration upon said Geiger tube being subjected to a condition to which it is sensitive; a transistor having a pair of input electrodes and a pair of output electrodes, means providing a forward biasing current for said transistor to establish a normal conducting state therefor, means connecting the input electrodes of said transistor to said Geiger tube to provide a reverse biasing current during each individual signal pulse to thereby render said transistor non-conductive for each individual signal pulse, a load impedance connected in series with the output electrodes of said transistor; and further means having a first portion connected to the output electrodes of said transistor and having a second portion connected to said load impedance, said further means being jointly controlled by a signal voltage which alternately appears across said output electrodes and then across said load impedance as said transistor alternates between said non-conducting and said conducting state, said further means providing a control output only when a pre-determined relationship exists between the time of conduction and non-conduction of said transistor.

3. Control apparatus comprising: condition sensing means of the type adapted to supply a series of spaced signal pulses of short time duration separated by a short time interval upon said condition sensing means being subjected to a condition to which it is sensitive; a first transistor having a pair of input electrodes and a pair of output electrodes, means connecting the input electrodes of said first transistor to said condition sensing means to cause said first transistor to alternate between a first and a second state of operation in response to an individual signal pulse and the time space between the individual signal pulse and the succeeding signal pulse, a load impedance, circuit means connecting said load impedance in series with the output electrodes of said first transistor, a second and a third transistor, circuit means connecting the input electrodes of said second transistor to said load impedance, circuit means connecting the input electrodes of said third transistor to the output electrodes of said first transistor; and further means connected to the output electrodes of said second and third transistor and providing an output in response to a pre-determined relationship between the time during which said first transistor is conductive and the time during which said first transistor is non-conductive.

4. Control apparatus comprising; condition sensing means adapted to be subjected to a given condition and effective to then supply a continuous series of space signal pulses separated by random time intervals of relatively short time duration in response to the presence of said given condition; a first transistor having a pair of input electrodes and a pair of output electrodes, biasing means connected to the input electrodes of said first transistor and effective to establish a normal conducting state for said first transistor, circuit means connecting the input electrodes of said first transistor to said condition sensing means to apply a reverse bias to said first transistor and render said first transistor non-conductive for each of said individual signal pulses, a load impedance, a source of operating voltage, circuit means connecting the output electrodes of said first transistor in series with said load impedance to said source of operating voltage such that the voltage of said source of operating voltage alternately appears across said load impedance and across the output electrodes of said first transistor as said first transistor alternates between said conducting and said non-conducting states; a second transistor having input and output electrodes, biasing means connected to the input electrodes of said second transistor and effective to establish a non-conducting state therefor, circuit means connecting the input electrodes of said second transistor to said load impedance to apply a forward bias to said second transistor in accordance with the integrated voltage appearing across said load impedance; a third transistor having input electrodes and output electrodes, biasing means connected to the input electrodes of said third transistor to establish a conducting state therefor, circuit means connecting the input electrodes of said third transistor to the output electrodes of said first transistor to apply a reverse bias to said third transistor in accordance with the integrated voltage appearing across the output electrodes of said first transistor; and further control means connected to the output electrodes of said second and third transistors to be controlled thereby and effective to provide an output only when said second and third transistors are both non-conductive.

5. Control apparatus comprising; condition sensing means of the type providing the series of individual signal pulses spaced by a short time interval of no signal upon said condition sensing means being subjected to a condition to which it is sensitive; a first transistor, means including circuit means connected to said first transistor and connecting said transistor to said condition sensor to thereby cause said first transistor to alternately operate in a first and a second state in response to an individual signal pulse and to the time duration between signal pulses; a second and a third transistor, means including circuit means connecting said second and third transistors to said first transistor to be controlled thereby, each of said second and third transistors being controlled respectively by the first and the second states of operation of said first transistor; and output means including said second and third transistors and effective to provide an output indicative of the presence of the condition to which said condition sensor is sensitive only upon a pre-determined relationship existing between the time periods of operation of said first transistor in said first and second states.

References Cited in the file of this patent
UNITED STATES PATENTS

| | | |
|---|---|---|
| 2,638,731 | Klein | May 19, 1953 |
| 2,838,680 | Bender | June 10, 1958 |
| 2,956,168 | Pinckaers | Oct. 11, 1960 |
| 3,015,031 | Dilworth | Dec. 26, 1961 |